May 31, 1932. P. J. SIMMEN Re. 18,484

AUTOMATIC TRAIN CONTROL

Original Filed Feb. 1, 1923

Paul J. Simmen Inventor by Barton A. Bean

Attorney

Reissued May 31, 1932 Re. 18,484

UNITED STATES PATENT OFFICE

PAUL J. SIMMEN, OF EDEN, NEW YORK

AUTOMATIC TRAIN CONTROL

Original No. 1,593,143, dated July 20, 1926, Serial No. 616,247, filed February 1, 1923. Application for reissue filed May 17, 1928. Serial No. 278,568.

This invention relates to railway train control systems, especially those in which track circuit control is used and more especially those involving track circuit control and central control, such as from a dispatcher's station.

The invention is particularly directed to a system involving central office means for giving different signal aspects to a train at the entrance of a block, said signal aspects being controlled both from a central office and a track circuit. The signal aspects are either of the fixed signal type or the cab signal type, or both, and other means are provided for indicating or recording at the central office the location of trains, the time when passing certain locations and the kind of signal displayed.

In describing the invention in detail, reference is had to the accompanying drawings, wherein I have illustrated a preferred physical embodiment of my invention and wherein like characters of reference, designate corresponding parts throughout the several views, and in which.

Figures 1, 2:
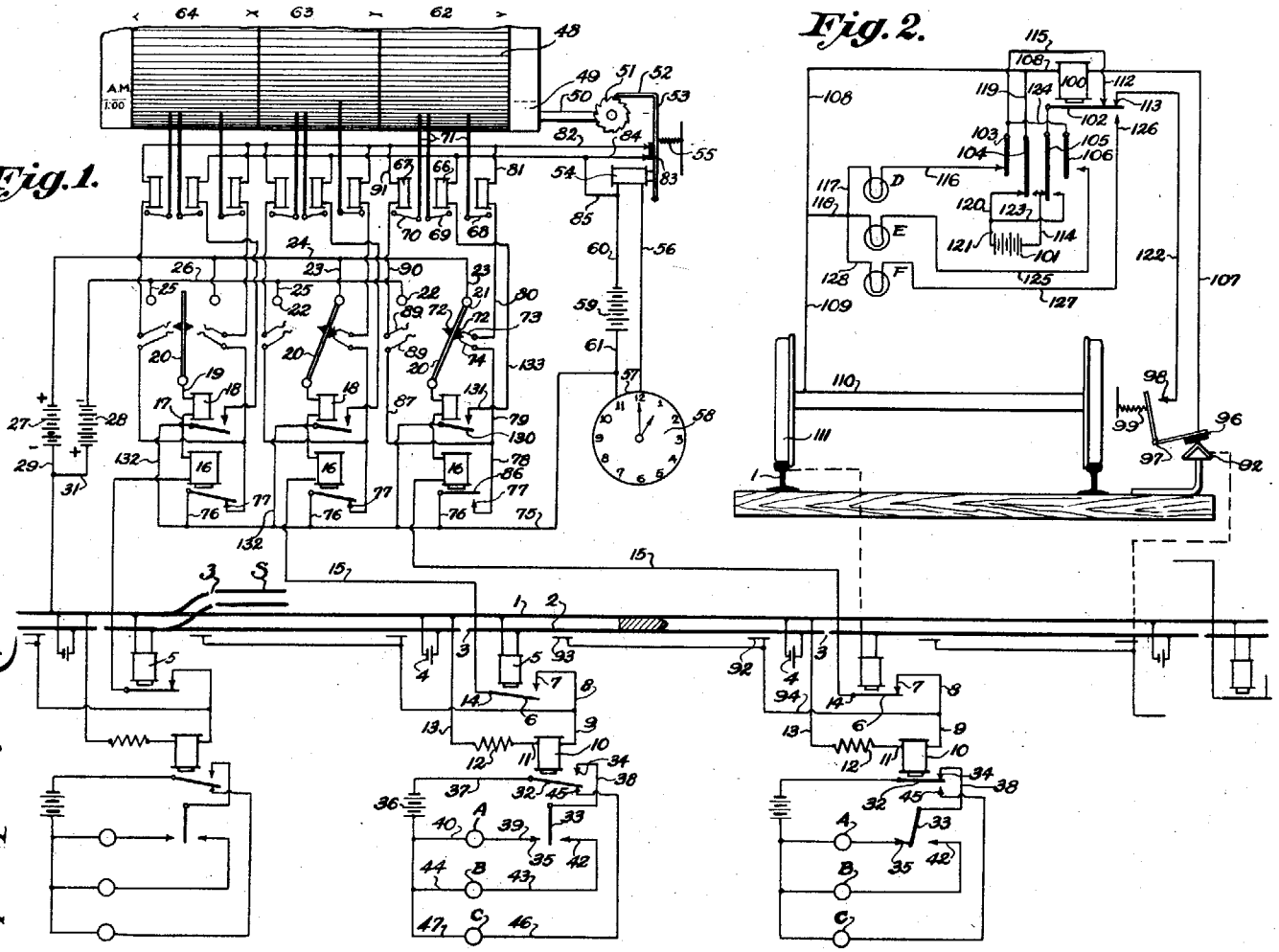
Figure 1 is a diagrammatic representation of the apparatus and circuits in the dispatcher's office and along the track.
Fig. 2 illustrates the apparatus and circuits on a locomotive or car, by which, with certain cooperating parts of Fig. 1, the signals are repeated on the locomotive or car.

Fig. 1 shows a track consisting of rails 1 and 2. Rail 1 is electrically continuous and rail 2 is divided into sections by means of insulating joints 3, thus dividing the track into electrically isolated block sections. Near one end of each block is a track battery 4 and near the other end of the block is a track relay 5, constituting with their connections a track circuit well known to the art. Each track relay controls an armature 6, which when the track relay is energized, closes the front contact 7 and when the track relay is deenergized, the armature drops and opens this front contact. Front contact 7 is connected by wires 8 and 9 to a polarized relay 10, which relay is located along the track in a suitable housing. The other terminal of relay 10 is connected by wire 11, resistance 12 and wire 13 to track rail 1. From the hinged end 14 of armature 6, a wire 15 leads to the dispatcher's office, interlocking tower or way station and connects to one terminal of relay 16, the other terminal of relay 16 is connected to wire 17 to a second relay 18. The function of relay 18 will be explained hereinafter in connection with the description of the means to record the signals displayed on the locomotive. From the other terminal of relay 18, a wire 19 connects to a manually operated switch 20. When switch 20 is placed in the right hand oblique position, as viewed in Fig. 1, it will electrically connect with terminal 21 and when placed in the left hand oblique position, it will electrically connect with terminal 22. When switch 20 is in the vertical position, it is disconnected from both terminals 21 and 22. Terminal 21 is connected by wire 23 to bus 24 and terminal 22 is connected by wire 25 to bus 26. Bus 24 is connected to the positive pole of the battery, or other electrical source 27 and bus 26 is connected to negative pole of the battery or other electrical source 28. The negative pole of battery 27 is connected by wire 29 to wire 30 and the positive pole of battery 28 is connected by wire 31 also to wire 30. Wire 30 is connected to track rail 1.

By means of manually operated switch 20, polarized relay 10 along the track can either be positively energized or negatively energized or deenergized, thus conditioning the armatures of relay 10 to control three different signals along the track. The signals are shown as A, B and C. Polarized relay 10 controls a neutral armature 32 and a polarized armature 33. When relay 10 is positively energized, armature 32 closes front contact 34 and armature 33 is in the left oblique position thus closing contact 35. When the two armatures are in this position, a circuit is established through signal A as follows:—from one side of battery 36, wire 37, armature 32, front contact 34, wire 38, armature 33, contact 35, wire 39, signal A, wire 40, wire 41, to the other side of battery 36.

When relay 10 is negatively energized, armature 32 closes front contact 34 and armature 33 is in the right oblique position, thus closing contact 42. When the two armatures are in this position, a circuit is established through signal B as follows:—from one side of battery 36, wire 37, armature 32, front contact 34, wire 38, armature 33, contact 42, wire 43, signal B, wires 44 and 41 to the other side of battery 36.

When relay 10 is deenergized, armature 32 drops away from front contact 34 and closes the back contact 45. Under these conditions no energy can be supplied to either signal A or B, since front contact 34 is open, but a circuit is established through signal C as follows:—from one side of battery 36, wire 37, armature 32, back contact 45, wire 46, signal C, wires 47 and 41, to other side of battery 36.

A, B, and C are merely diagrammatic but may be considered signal lamps which are lit when their respective circuits are closed or they may be translating devices such as relays by which circuits are controlled to operate semaphore signals in a manner well known to those skilled in the art.

The signals A, B and C are placed along the track at suitable locations in the usual manner. Signal A may represent a clear signal, signal B caution signal and signal C a danger signal, or the signals may be used to convey any instructions to the engineer which the management of the railway may designate.

The positions of armatures 32 and 33 of the polarized relay 10 are controlled from the dispatcher's office in the following manner:—when the manually operated switch 20 is in the right oblique position, polarized relay 10 is positively energized through the following circuit:—from positive pole of battery 27, bus 24, wire 23, terminal 21, switch 20, wire 19, relay 18, wire 17, relay 16, line wire 15, armature 6 of track relay 5, front contact 7, wires 8 and 9, polarized relay 10, wire 11, resistance 12, wire 13, track rail 1, and wires 30 and 29, to negative side of battery 27. When the hand operated switch 20 is placed in the left oblique position, polarized relay 10, is negatively energized through the following circuit:—from negative pole of battery 28, bus 26, wire 25, terminal 22, switch 20, wire 19, relay 18, wire 17, relay 16, line wire 15, armature 6 of track relay 5, front contact 7, wires 8 and 9, polarized relay 10, wire 11, resistance 12, wire 13, track rail 1, and wires 30 and 31 to positive pole of battery 28, the circuit being traced against the flow of current. When the manually operated switch 20 is in the vertical position, polarized relay 10 is deenergized, since both batteries 27 and 28 are disconnected from it.

It will thus be seen that so long as current is flowing from the battery 27 in the dispatcher's office through polarized relay 10, signal A will be displayed, and so long as current is flowing from battery 28 in the dispatcher's office through polarized relay 10, signal B is displayed. When current flows from neither battery 27 nor 28 through polarized relay 10, signal C is displayed. In addition to the manual control of signals A, B and C from the dispatcher's office, automatic control of these signals is also provided by a track circuit in the following manner:—As long as there is no train in the block ahead, track relay 5 is energized and armature 6 of track relay closes front contact 7, thus permitting the display of signal A or B from the dispatcher's office. When however a train is in the block ahead, as shown in hatched lines, the energy from the track battery 4 is short circuited through the wheels and axles of the train in the manner well known to one skilled in the art. Track relay 5 is therefore not sufficiently energized to maintain armature 6 in the position to make contact with front contact 7, consequently the armature 6 drops away and front contact 7 is broken. When this condition exists, no electrical energy can reach polarized relay 10 and this relay becomes deenergized, thus invariably signal C will be displayed irrespective of whether switch 22 in the dispatcher's office is positioned to send positive or negative energy to polarized relay 10.

The recording of train movements and the kind of signal displayed at the dispatcher's office is accomplished in the following manner:—In the dispatcher's office is a suitably mounted record sheet 48 driven by a roller 49, which in turn is driven by a shaft 50. Shaft 50 receives motion through ratchet wheel 51. A pawl 52 is connected to armature 53 of electro-magnet 54, and when electro-magnet 54 is periodically energized, motion is given to ratchet wheel 51 through pawl 52. A spring 55 normally pulls armature 53 and pawl 52 to the right when electro-magnet 54 is not energized. Electro-magnet 54 is connected by wire 56 to a make-and-break device 57, which make-and-break device is periodically operated by clock work 58, this device may be made in accordance with that shown in my prior Patent 1,203,146 granted October 31, 1916. When the make-and-break device is closed the electro-magnet 54 is energized through the following circuit:—from one side of battery 59, wire 60, magnet 54, wire 56, make-and-break device 57, wire 61 to the other side of battery 59. The make-and-break device 57 is operated say every 5 seconds, so as to give a slow and uniform movement to record sheet 48 through ratchet wheel 51 and pawl 52.

Record sheet 48 is transversely divided into sections as 62, 63 and 64, each section representing a block along the track. Longitudinally the record sheet is divided into time lines, such as 1 a. m., each one of the lines representing a one minute interval. It will thus be seen that longitudinally the record sheet assumes a constantly changing position during the 24 hours of the day.

Adjacent to the record sheet are located perforating magnets 65, 66 and 67 controlling their respective armatures 68, 69 and 70. Pivotally attached to armatures 68, 69 and 70 are perforating needles 71 so positioned adjacent to the record sheet that when a perforating magnet is energized, a perforation is made in the record sheet. There are three such perforating magnets for each block. Perforating magnet 65 is operatively connected when manually operated switch 20 is in the right oblique position and perforating magnet 67 is operatively connected when switch 20 is in the left oblique position. Perforating magnet 66 is operated in a manner to be described hereinafter.

The means for operatively connecting perforating magnet 65, when switch 20 is in the right oblique position is as follows:—A metallic wedge 72 attached to switch 20 and insulated therefrom is positioned so as to force contact springs 73 and 74 apart, thus electrically connecting the two contact springs and thus establishing an electrical circuit through perforating magnet 65 as follows:—from one side of battery 59, wire 61, wire 75, wire 76, armature 86 of relay 16, back contact 77, wire 78, wire 79, contact spring 74, wedge 72, contact spring 73, wire 80, perforating magnet 65, wires 81 and 82, to a metallic contact plate 83, which is attached to armature 53, and thence by wires 84, 85 and 60 to the other side of battery 59. When the switch 20 is in the left oblique position, an electrical circuit is established through perforating magnet 67 as follows:—from one side of battery 59, wire 61, wire 75, wire 76, armature 86 of relay 16, back contact 77, wire 78, wire 87, contact spring 88, wedge 72, contact spring 89, wire 90, perforating magnet 67, wire 91, wire 82, to metallic contact plate 83, and thence by wires 84, 85 and 60 to the other side of battery 59.

The circuits through perforating magnets 65 and 67 just described are closed only when relay 16 is deenergized thus closing back contact 77 and further when electro-magnet 54 is energized thus closing contacts to wire 82 and 84 through metallic plate 83 attached to armature 53. Since electro-magnet 54 is only periodically energized through the make-and-break device 57, it follows that the circuit through either perforating magnet 65 or 67 is periodically broken through contact plates 83.

I will now describe the method of recording train movements and the kind of signals displayed upon the record sheet 48. Whenever switch 20 is in the right oblique position making contact with terminal 21, polarized relay 10 along the track is positively energized, if no train is on the section controlling this relay, thus displaying signal A. At the same time current is flowing through relay 16 in the dispatcher's office, thus lifting its armature 86 and breaking back contact 77. Under these conditions perforating magnet 65 is not energized and no record is made on the record sheet. As soon however as a block is occupied by a train, track relay 5 becomes deenergized and its armature 6 drops away from front contact 7. This results in the breaking of the main circuit from the dispatcher's office and relay 16 becomes deenergized thus closing back contact 77. When this occurs perforating magnet 65 becomes periodically energized (say every 5 seconds) and a perforation is made in the record sheet periodically through perforating needle 71. Since record sheet 48 is longitudinally moved continuously, the exact time when the train entered the block is recorded on the record sheet and this perforation is continued as long as a train remains in the block, thus also recording the length of time the train remained in the block. Whenever the train has left the block armature 6 of track relay 5 again closes front contact 7 thus again completing the main circuit to the dispatcher's office. Under these conditions relay 16 is again energized and the circuit through perforating magnet 65 is broken through back contact 77, which results in perforating magnet 65 ceasing to operate.

Whenever switch 20 is in the left oblique position making contact with terminal 22, polarized relay 10 along the track is negatively energized, if there is no train in the section controlling this relay, thus displaying signal B. At the same time current is flowing through relay 16 in the dispatcher's office, thus lifting is armature 86 and breaking back contact 77. With switch 20 in this position perforating magnet 67 is operatively connected instead of perforating magnet 65 but no record is made on the record sheet until a train enters the block. When this occurs, track relay 5 becomes deenergized and its armature 6 drops away from front contact 7. This results in the breaking of the main circuit from the dispatcher's office and relay 16 becomes deenergized, thus closing back contact 77. When this occurs perforating magnet 67 becomes periodically energized, thus making a record on the record sheet as hereinbefore described. It will thus be seen that when the switch 20 is in the position to display signal A, and a train enters a block, a record is made on the record sheet through perforating magnet 65; and when switch 20 is in the position to display signal B, and a train enters a block, a record is made on the record sheet through perforating magnet 67. Since perforating magnets 65 and 67 are transversely positioned differently in respect to the record sheet, the record will clearly show whether signal A or signal B was displayed prior to the train entering the block.

Whenever switch 20 is in the vertical position thus displaying signal C, no record is made through either perforating magnets 65 or 67 since the circuits to these magnets are now open at contact springs 73 and 74 or contact springs 88 and 89.

The invention so far described shows means to display three signals along the trackway for each block by means of manually operated switches under the control of the dispatcher also means to automatically control signals by track circuit and means to record on the record sheet in the dispatcher's office at what time a train entered a block, and at what time the train left the block; at the same time distinguishing on the record whether signal A or signal B was displayed to the train. Under certain conditions it may be desirable to also display similar signals on the locomotive so as to bring the signals displayed along the trackway more forcibly to the notice of the engineer or these signals on the locomotive may also be used for the purposes of automatic train control or speed control. The means for duplicating the signals along the trackway on the locomotive or car will now be described.

In Fig. 1 train control rails 92 and 93 are located adjacent to the track, train control rail 92 being the home train control rail and positioned near the end of the new block, train control rail 93 being the distant train control rail and being located approximately braking distance from the beginning of the new block. These train control rails may be positively energized, negatively energized or deenergized similarly to, and at the same time as polarized relay 10. The circuit through the dispatcher's office by which the different electrical conditions are established are similar to those described for polarized relay 10, and are as follows:—When the train control rails are positively energized it is by a circuit established from positive pole of battery 27, bus 24, wire 23, terminal 21, manually operated switch 20, wire 19, relay 18, wire 17, relay 16, line wire 15, armature 6 of track relay 5, front contact 7, wires 8 and 94, to train control rails 92 and 93, thence through a circuit on the locomotive to be described hereinafter to track rail 1 and thence through wires 30 and 29 to the negative side of battery 27. When the train control rails are negatively energized, the circuit through the dispatcher's office is as follows:—from negative side of battery 28, bus 26, wire 25, terminal 22, switch 20, wire 19, relay 18, wire 17, relay 16, line wire 15, armature 6 of track relay 5, front contact 7, wires 8 and 94, to train control rails 92 or 93 and thence through a circuit on the locomotive to be described hereinafter to track rail 1 and thence through wires 30 and 31 to positive pole of battery 28. When switch 20 in the dispatcher's office, is in the vertical position, train control rails 92 and 93 are deenergized. Signal rails 92 and 93 are also deenergized, by reason of a train in the block ahead by which front contact 7 of track relay 5 is broken in a similar manner as hereinbefore described. It will thus be seen that when signal A is displayed along the track, the train control rails 92 and 93 are positively energized; when signal B is displayed along the track, the train control rails 92 and 93 are negatively energized and when signal C is displayed along the track, the train control rails 92 and 93 are deenergized.

The cab circuits capable of displaying three different signals corresponding to the three different electrical conditions of the train control rails are shown in Fig. 2 and are similar to the circuits shown in my prior Patent No. 1,239,049, granted September 4th, 1917.

In Fig. 2 the signals are designated D, E, and F. While these signals in Fig. 2 are shown as lamps, they may equally represent an electro-magnetic device to which motion is given depending upon whether the circuit is energized or deenergized, and such electro-magnetic devices may be used for other purposes than or in addition to the display of signals to the engineer, such as the proper control of speed control devices or electro-pneumatic air valves or both.

In Fig. 2 is shown an electric contact shoe 96 so positioned on the locomotive as to make contact with the train control rails 92 and 93. The contact shoe is hinged at 97. Train control rails 92 and 93 are inclined at the ends so as to form a ramp in the usual manner, as shown in my prior Patent No. 1,140,623, granted May 25, 1915, and when the contact shoe slides along the ramp, the shoe is tilted so as to break contact 98. This action of the shoe compresses spring 99. When the contact shoe leaves the other end of the train control rail, spring 99 forces contact shoe to the normal position, making contact with contact 98. The locomotive also carries a polarized relay 100 and a battery 101. The polarized relay 100 controls a neutral armature 102 and four polarized armatures 103, 104, 105 and 106. Polarized armatures 104 and 105 are pole changing members of a switch for the purpose of changing the polarity of the flow of current from battery 101. Polarized armature 103 controls by its position, signal D, and polarized armature 106 controls by its position signal E, and neutral armature 102 controls by its position signal F. Depending upon the direction of the flow of current in the polarized relay 100, polarized armatures 103, 104, 105 and 106 will assume either one or the other of its two positions.

When the contact shoe 96 is passing a train control rail which is positively energized, an electrical circuit is established through battery 27 in the dispatcher's office as follows:— from positive side of battery 27, bus 24, wire 23, terminal 21, switch 20, wire 19, relay 18, wire 17, relay 16, line wire 15, armature 6 of track relay 5, front contact 7, wires 8 and 94, to train control rail 92 or 93 and thence through contact shoe 96, wire 107, polarized relay 100, wires 108 and 109, axle 110, wheel 111, rail 1 and wires 30 and 29, to the negative side of battery 27. Under these conditions polarized relay 100 will be positively energized, neutral armature 102 will make contact with front contacts 112 and 113 and polarized armatures 103, 104, 105 and 106 will assume the left hand position as shown in Fig. 2. With the armatures of polarized relay 100 in the positions described a circuit is established through signal D as follows:—battery 101, wire 114, polarized armature 105, neutral armature 102, contact 112, wire 115, polarized armature 103, wire 116, signal D, wire 117, wire 118, wire 108, wire 119, polarized armature 104, wire 120, wire 121, to the other side of the battery 101. When the shoe 96 leaves the other end of the thus positively energized train control rail, contact 98 is again made and a stick circuit is established through polarized relay 100, which maintains the armatures of the relay in the same position as follows:—from one side of battery 101, wire 114, polarized armature 105, neutral armature 102, front contact 113, wire 122, to shoe contact 98, thence through shoe 96, wire 107, polarized relay 100, wires 108 and 119, polarized armature 104, wires 120 and 121, to the other side of battery 101, thus the signal indication obtained at a train control rail is continued until the next train control rail is reached.

When the contact shoe 96 makes contact with a train control rail which is negatively energized, an electrical circuit is established through the dispatcher's office as follows:—from negative side of battery 28, bus 26, wire 25, terminal 22, switch 20, wire 19, relay 18, wire 17, relay 16, line wire 15, polarized armature 6 of track relay 5, front contact 7, wires 8 and 94, to train control rails 92 or 93; thence through contact shoe 96, wire 107, polarized relay 100, wires 108 and 109, axle 110, wheel 111, to track rail 1, and thence through wires 30 and 31, to the positive pole of battery 28, the circuit being traced against the flow of current.

Under these conditions of current flow, polarized relay 100 will be negatively energized, neutral armature 102 will still make contact with front contacts 112 and 113 but the polarized armatures 103, 104, 105 and 106 will now assume the right hand position opposite to the one as shown in Fig. 2. With the armatures of polarized relay in the position as last described, a circuit through signal D is broken by armature 103 but a new circuit through signal E is established as follows:—battery 101, wire 114, armature 104, wires 119, 108, 118, signal E, wire 125, armature 106, wires 124 and 115, contact 112, armature 102, armature 105 and wires 123 and 121, battery 101. When the shoe 96 leaves the other end of the negatively energized train control rail, shoe contact 98 is again closed and a stick circuit is established through polarized relay 100, which maintains the armatures of the relay in the same position as follows:—from one side of battery 101, wire 114, polarized armature 104, wire 119, wire 108, electro-magnet 100, wire 107, shoe 96, contact 98, wire 122, contact 113, armature 102, armature 105, and wires 123 and 121 to battery 101, thus continuing the indication obtained at the train control rail just passed.

When shoe 96 contacts with train control rail which is deenergized signal F is established on the locomotive in the following manner:—When shoe 96 moves along the ramp portion of the train control rail, shoe contact 98 opens and thus the stick circuit, which normally maintains polarized relay 100 energized between the train control rails is broken. Under these conditions neutral armature 102 drops and the circuit through signal D or E is broken at front contact 112. When neutral armature 102 drops, it makes contact with the back contact 126, thus establishing a circuit through signal F as follows:—from one side of battery 101, wire 114, polarized armature 105, neutral armature 102, back contact 126, wire 127, signal F, wires 128 and 118, wires 108 and 119, polarized armature 104, wires 120 and 121, to the other side of battery 101. When the contact shoe leaves a deenergized rail the shoe contact is again closed, but the normal stick circuit through polarized relay 100 is not reestablished, since this circuit is now broken at front contact 113. Thus signal F is continued until an energized train control rail is reached.

Separate means for recording the display of signals established on the locomotive in response to energized conditions of the signal rails are provided for as follows:—The winding of relay 18 in the dispatcher's office is so proportioned that it will require a larger current to attract its armature 130, than relay 16 requires to attract its armature 86. As long as the locomotive contact shoe 96 is not on a train control rail 92 or 93, a current is flowing through polarized relay 10 and resistance 12 and the amount of current flowing through this circuit is not sufficient to lift armature 130 of relay 18, but this current is sufficient to lift armature 86 of relay 16. When however, the locomotive contact shoe 96 is in contact with train control rails 92 or 93, a branch circuit is established through wire 94 which does not include polarized relay 10 or resistance 12 and the combined resistance of polarized relay 10 and resistance 12 is considerably greater than the resistance of polarized relay 100 on the locomotive. Under these conditions a greater amount of current is flowing through relay 18 in the dispatcher's office, which is sufficient to lift its armature 130 and make contact with front contact 131; thus every time a locomotive is passing a train control rail, armature 130 of relay 18 closes front contact 131, and establishes a circuit through perforating magnet 66 as follows:—from one side of battery 59, wire 61, wire 75, wire 132, armature 130 of relay 18, front contact 131, wire 133, perforating magnet 66, wires 134, 85 and wire 60, to the other side of battery 59. Since the circuit through perforating magnet 66 is not taken through the periodically broken contact on plate 83, only a single perforation is made on the record sheet, whenever the locomotive is passing a train control rail.

The utility of the invention lies in the fact that a dispatcher or other central office operator knows from his record sheet where the various trains on his division are located and he is able to display by the manual operation of the switch 20, three distinct signals along the track or along the track and on the locomotive. Signals A and D may be used to indicate to the locomotive engineer that the block ahead is clear. Signals C and F may be used to indicate to a locomotive engineer that the block ahead is at danger or that he should stop and report to the dispatcher by telephone and signals B and E may be used to indicate to the locomotive engineer that he should stop and report to the dispatcher or that he should proceed at limited speed, or that, for instance, he should take the next siding ahead as shown at S in Fig. 1. Or the three signals may be used to indicate any instructions as determined by the railway executives. In no case, however, can signals A and D, or B and E, as controlled by the dispatcher be effective unless the block immediately ahead is unoccupied by a train.

Although I have particularly described one of the physical embodiments of my invention and illustrated the same, nevertheless I desire to have it understood that the particular embodiment illustrated is merely illustrative, and does not exhaust the possible physical embodiment of means underlying the principle of my invention.

What is claimed is:

1. In a railway train control system, in combination; a trackway; means for dividing the trackway into electrically isolated sections; a vehicle movable over said trackway; train signal means associated with each section; corresponding train control instrumentalities positioned on the vehicle; a central station; means positioned at the central station whereby the signals along the trackway associated with each section may be caused to display a plurality of aspects and whereby the train control instrumentalities on the vehicle may be caused to display corresponding aspects, and means for recording at the central station the entrance of a train into a section and the particular aspect received by that train upon entering the section.

2. In a railway train control system, in combination; a trackway; means for dividing the trackway into electrically isolated sections; a vehicle movable upon the trackway; a central station; means positioned at the central station dependent upon the presence or absence of a vehicle upon a section for displaying at the entrance to said section any one of a plurality of signal aspects; and means positioned at the central station for recording the particular aspect accepted by a vehicle.

3. In a railway train control system, in combination; a trackway divided into blocks; train control devices adjacent each block, means for energizing said train control devices, at least three signals, each differentiated from the other, located adjacent each block; vehicle carried train control instrumentalities corresponding to said signals and severally responsive to the electrical conditions of said train control devices; central station means for selectively operating a particular signal and establishing an electrical condition of said control rails corresponding to the signal selected; means controlled by said central station means for automatically indicating the movement of a vehicle in relation to the signal displayed at the entrance of a block and other means automatically operative during an operation of said last-named indicating means for indicating the movement of a vehicle in relation to said blocks.

4. In a railway train control system, in combination; a trackway divided into blocks; train control devices adjacent each block, means for energizing said train control devices, at least three signals, each differentiated from the other, located adjacent each block; vehicle carried train control instrumentalities corresponding to said signals and severally responsive to the electrical conditions of said train control devices; central station means for selectively operating a particular signal and establishing an electrical condition of said control rails corresponding to the signal selected; means controlled by said central station means for automatically giving a continuous indication of the movement of the vehicle in a block and in relation to the signal displayed at the entrance of such block; and other means automatically operative during the operation of said last-named indicating means for indicating the movement of a vehicle in relation to said blocks.

5. In a railway train control system, in combination; a trackway divided into blocks;

train control devices adjacent each block, means for energizing said train control devices, at least three signals, each differentiated from the other, located adjacent each block; vehicle carried train control instrumentalities corresponding to said signals and severally responsive to the electrical conditions of said train control devices; central station means for selectively operating a particular signal and establishing an electrical condition of said control rails corresponding to the signal selected; means controlled by said central station means for automatically recording the movement of a vehicle in relation to the signal displayed at the entrance of a block and other means automatically operative during an operation of said last-named recording means for recording the movement of a vehicle in relation to said blocks.

6. In a railway train control system, in combination; a trackway divided into blocks; train control devices adjacent each block, means for energizing said train control devices, at least three signals each differentiated from the other, located adjacent each block; vehicle carried train control instrumentalities corresponding to said signals and severally responsive to the electrical conditions of said train control devices; central station means for selectively operating a particular signal and establishing an electrical condition of said control rails corresponding to the signal selected; means controlled by said central station means for automatically giving a continuous record of the movement of the vehicle in a block and in relation to the signal displayed at the entrance of such block; and other means automatically operative during the operation of said last-named recording means for recording the movement of a vehicle in relation to said blocks.

7. In a railway train control system, in combination; a trackway divided into blocks; at least three signals, each differentiated from the other, located adjacent each block; circuits for said signals; a relay capable in accordance with its electrical condition, of selectively closing the circuit of a particular signal; central station means for varying the condition of said relay, said central station means including circuits having a common wire; a track battery and track relay for each block; and an armature controlled by the track relay and operative to open or close the circuits of said central station means at a point in said common wire.

8. In a railway train control system, in combination; a trackway divided into blocks; at least three signals, each differentiated from the other, located adjacent each block; vehicle carried train control instrumentalities corresponding to said signals; control rails adjacent each block to the electrical condition of which said control instrumentalities are severally responsive; and central station means for selectively operating a particular signal and establishing an electrical condition of said control rails corresponding to the signal selected.

9. In a railway train control system, in combination; a trackway divided into blocks; at least three signals, each differentiated from the other, located adjacent each block; vehicle carried train control instrumentalities corresponding to said signals; control rails adjacent each block to the electrical condition of which said control instrumentalities are severally responsive; central station means for selectively operating a particular signal and establishing an electrical condition of said control rails corresponding to the signal selected and means controlled by the presence of a vehicle in a block for automatically selecting the operation of a particular signal at the entrance to such block regardless of the selection for which said central station means may have been operated.

10. In a railway signal and dispatching system; a trackway divided into blocks, means for controlling three different signals for directing the movement of a train approaching a block, a central office, circuit from the central office to said signal controlling means, unitary manual means at the central office operative to condition said signal controlling means to display any one of said signals when the block is unoccupied by a train, and track circuit means operative to condition said signal controlling means to display one of said signals automatically when a train is in said block, said track circuit means rendering ineffective the central office means for conditioning the signal controlling means while a train is in said block.

11. In a railway signal and dispatching system; a trackway divided into blocks; a track circuit for each block; three fixed signals at the entrance to each block for giving three different indications to the train; a circuit controlled at a central office and selectively controlling said signals; track circuit means for also controlling said signals and enforcing the display of a predetermined signal irrespective of the selection at the central office; and means at the central office rendered operable by said selected signal control circuit for indicating the movement of trains.

12. In a railway signal and dispatching system; a train; a trackway divided into blocks; a track circuit for each block; three cab signals on each train including a danger signal; a single circuit controlled at a central office and controlling said three signals; and track circuit means for also preferentially controlling said signals and actuating the danger signal.

13. In a railway signal and dispatching system; a train; a trackway divided into blocks; a track circuit for each block; three cab signals on each train; a central office, a circuit controlled at said central office and selectively controlling said signals; track circuit means for also controlling said signals; and means at said central office rendered operable by said selected signal control circuit for indicating the progress of the train from block to block.

14. In a railway signal and dispatching system; a train; a trackway divided into blocks; track circuit for each block; three fixed signals at the entrance to each block; three cab signals on each train; a circuit controlled at a central office and controlling said signals; and track circuit means for also controlling said signals.

15. In a railway signal and dispatching system; a train; a trackway divided into blocks; a track circuit for each block; three fixed signals at the entrance to each block; three cab signals on each train; a central office, a circuit controlled at said central office and selectively controlling said signals; track circuit means for also controlling said signals; and means at said central office rendered operable by the actuation of a signal circuit for indicating and recording the progress of the train from block to block.

16. In a railway signal and dispatching system; a trackway divided into blocks, each block provided with a track circuit; a central office; sources of electric currents of different kinds at the central office; three signals governing train movements into each block; a single circuit between said central office and said signals; unitary selective means at the central office for conditioning said circuit in three different ways, one way for each signal; and track circuit means for also conditioning said signals and causing the display of one of them irrespective of the selection at the central office.

17. In a railway signal and dispatching system; a trackway divided into blocks, each block provided with a track circuit; a central office; sources of electric currents of different kinds at the central office; three signals governing train movement into each block; a circuit between said central office and said signals; means at the central office for conditioning said circuit in three different ways, one way for each signal; track circuit means for also conditioning said signals; and means cooperating with the track circuit for indicating at the central office the location of a train.

18. In a railway signal and dispatching system; a trackway divided into blocks; three signals at the entrance to a block for governing train movements, one signal indicating proceed, another signal indicating take siding and the third signal indicating stop; unitary means at a central office to display any one of the three signals; and track circuit means operative to display the stop signal only and to prevent the display of the proceed and siding signals by the central office means as long as the block is occupied by a train.

19. In a railway signal and dispatching system; three different signals for directing the movement of trains; two means for the control of the signals, one means being a track circuit and the other being located at a central point; and means at said central point selectively controlled by the control means for indicating the location of a train.

20. In a railway signal and dispatching system; a trackway divided into blocks, each block provided with a track circuit; a central office; sources of currents of different kinds at the central office; three signals governing train movement into each block; an electrical device along the track; a circuit between said central office and said electrical device; means at the central office for conditioning said electrical circuit and said device in three different ways from said source of currents, one for each signal; means on the train responsive to the electrical condition of said device for governing the movement in accordance with said signals and track circuit means for also conditioning said signals.

21. In a railway signal and dispatching system; a trackway divided into blocks, each block provided with a track circuit; a central office, three signals governing train movements into each block; a circuit for each signal; unitary means at said central office for selectively actuating each signal circuit; and track circuit means for also selectively controlling said signal circuits in a predetermined manner irrespective of the selection at the central office.

22. In a railway control system, the combination of a trackway divided into blocks, at least three signals for each block, each differentiated from the other, a central station, a circuit from the central station to a point adjacent each block for causing the actuation of each signal, each said circuit includng a common wire, a polarized relay disposed in each said circuit and positioned adjacent each block, each said relay being provided with armatures actuated by electric currents flowing through each said circuit, means at the central station for establishing a plurality of electrical conditions in each said relay for selectively actuating the armatures, a track battery and a track relay for each block, and an armature controlled by its track relay connected in the circuit from the central station to the polarized relay and operative to open or close the circuits of said central station.

23. In a railway signal and dispatching system; three different signals for directing the movement of trains; two means for the control of the signals, one means being a track circuit and the other being located at a central point; and means at said central point selectively actuated by the central point control means for controlling the recording of the location of a train upon the actuation of the track circuit means by a train.

24. In a railway control system, the combination of a track divided into blocks, fixed signals for each block, a train, cab signals on the train, a central station, a circuit from the central station to the fixed signals including a relay for selectively actuating the signals and a fixed resistance, ramps along the block, a circuit from the central station to the ramps, said ramp circuit and said fixed signal circuit having a common wire, said ramp circuit having a lower resistance than the fixed signal circuit, a relay in the ramp circuits located in the central office, an indicator circuit controlled by said relay, said relay having sufficient resistance to prevent the operation of the indicator circuit except upon the closing of the ramp circuit.

25. In a railway signal system, a trackway divided into blocks, a track circuit for each block, signal actuating means for each block, a central office, a circuit from the central office to said signal actuating means, means for selectively conditioning the signal actuating means, said conditioning means being located at the central office, a train, a signal circuit on the train controlled by the signal actuating means, indicating means at the central office operative upon the opening of the track circuit for reporting the entrance of a train to the block and the character of signal displayed, and additional means operative upon actuation of the train signal circuit for indicating the time when said train accepts a signal.

26. In a railway signal system, a trackway divided into blocks, fixed signals for each block for giving different indications to the train, a central office, a circuit extending from the central office to the fixed signals and selectively actuating said signals, a train adapted to move over the trackway, a circuit on the train including a plurality of selectively actuated cab signals corresponding to the fixed signals, actuating devices along the trackway for connecting the cab signals to the central office circuit, and means at the central office connected in said circuit for indicating the nature of signal displayed by the fixed signals and accepted by the train.

27. In a railway signal system, a trackway divided into blocks, fixed signals for each block for giving different indications to the train, a central office, a circuit extending from the central office to the fixed signals and selectively actuating said signals, a train adapted to move over the trackway, a circuit on the train including a plurality of selectively actuated cab signals corresponding to the fixed signals, actuating devices along the trackway for connecting the cab signals to the central office circuit, and means at the central office connected in said circuit for the cab signal actuating devices for indicating the time when the train accepts a given signal.

28. A non-train-order train dispatching and O. S. signalling system for railroads comprising, a manually operable circuit controller located convenient to a train dispatcher, a relay located at a siding distant from said controller, a circuit connecting said controller and relay, an indicating device connected in said circuit at the controller end of said circuit, a source of energy for energizing said relay and indicating device when said controller closes said circuit, and means for at times opening said circuit at the relay end of said circuit.

29. A non-train-order train dispatching and O. S. signalling system for railroads comprising, a manually operable circuit controller located convenient to a train dispatcher, a relay located at a siding distant from said controller, a circuit connecting said controller and relay, an indicating device connected in said circuit at the controller end of said circuit, a source of energy for energizing said relay and indicating device when said controller closes said circuit, and means operated in response to a moving train for opening said circuit.

30. A non-train-order dispatching and O. S. signalling system for railroads comprising, a manually operable circuit controller located convenient to a train dispatcher, a relay located at a siding distant from said controller, a circuit connecting said controller and relay, an indicating device connected in said circuit at the controller end of said circuit, a source of energy for energizing said relay and indicating device when said controller closes said circuit, a track relay at the relay end of said circuit, and a contact closed when said track relay is energized contained in said circuit.

PAUL J. SIMMEN.